United States Patent [19]

Bales et al.

[11] Patent Number: 5,516,877
[45] Date of Patent: May 14, 1996

[54] CROSSLINKABLE CARBONATE POLYMERS OF DIHYDROXYARYL FLUORENE

[75] Inventors: Stephen E. Bales; James P. Godschalx; Philip C. Yang; Matthew T. Bishop, all of Midland, Mich.; Maurice J. Marks, Lake Jackson, Tex.

[73] Assignee: The Dow Chemical Company, Midland, Mich.

[21] Appl. No.: 291,211

[22] Filed: Aug. 16, 1994

[51] Int. Cl.⁶ .................................................. C08G 64/00
[52] U.S. Cl. .................. 528/198; 528/171; 528/174; 528/176; 528/179; 528/196; 528/201; 528/204; 528/480; 528/481; 524/847
[58] Field of Search ........................ 528/198, 171, 528/174, 176, 179, 196, 201, 204, 480, 481; 524/847

[56] References Cited

U.S. PATENT DOCUMENTS

| | | |
|---|---|---|
| 3,128,264 | 4/1964 | Laakso et al. . |
| 3,546,165 | 12/1970 | Winthrop . |
| 3,781,378 | 12/1973 | Kantor et al. . |
| 4,310,652 | 1/1982 | DeBona et al. . |
| 4,708,994 | 11/1987 | Wong . |
| 4,925,913 | 5/1990 | Teramoto et al. . |
| 5,171,824 | 12/1992 | Marks et al. . |
| 5,196,479 | 3/1993 | Laughner et al. . |
| 5,198,527 | 3/1993 | Marks et al. .............. 528/198 |
| 5,391,693 | 2/1995 | Nakae . |

FOREIGN PATENT DOCUMENTS

| | | |
|---|---|---|
| 0591962 | 4/1994 | European Pat. Off. . |
| 0608493 | 8/1994 | European Pat. Off. . |
| 4412396 | 10/1994 | Germany . |
| 63-182336 | 7/1988 | Japan . |
| 1124358 | 5/1989 | Japan . |
| 5-155998 | 6/1993 | Japan . |
| 5-222182 | 8/1993 | Japan . |
| 5-228350 | 9/1993 | Japan . |
| 6-025399 | 2/1994 | Japan . |
| 6-025398 | 2/1994 | Japan . |
| 6-025401 | 2/1994 | Japan . |
| 6-049195 | 2/1994 | Japan . |
| 6-065362 | 3/1994 | Japan . |
| 6-091145 | 4/1994 | Japan . |
| 6-145332 | 5/1994 | Japan . |
| 6-145317 | 5/1994 | Japan . |
| 6-148438 | 5/1994 | Japan . |
| 6-172508 | 6/1994 | Japan . |
| 93-25607 | 5/1993 | WIPO . |

OTHER PUBLICATIONS

Donnet et al, *Carbon Fibers*, pub. Dekker, pp. 227–237 Dec. 1984.
Morgan, *Automatic Poly. with Large Cross–Planar Substituents*, Macromolecules, vol. 3, pp. 536–544 Dec. 1970.
Kambour et al., *Tough, Transparent Heat . . .* , J. Appl. Poly, Sci., vol. 20, pp. 3275–3293 Dec. 1976.
Kambour et al., *Enhancement of the . . .* , J. Poly, Sci., Poly., Letters Ed., vol. 16, pp. 327–333, Dec. 1978.
Morgan, *Aromatic Polyesters with Large . . .* , Macromolecules, vol. 3, pp. 536–544, Dec. 1970.

*Primary Examiner*—James J. Seidleck
*Assistant Examiner*—John M. Cooney, Jr.

[57] ABSTRACT

There are disclosed carbonate polymers of dihydroxyaryl fluorene having crosslinkable moieties. There are also disclosed such polymers in the form of composites. The polymers of this invention are capable of being crosslinked by activation of the crosslinkable moieties. Once crosslinked, these polymers demonstrate an excellent combination of properties including resistance to melting at high temperatures, solvent resistance, optical clarity, impact resistance, and physical strength.

19 Claims, No Drawings

CROSSLINKABLE CARBONATE POLYMERS OF DIHYDROXYARYL FLUORENE

FIELD OF THE INVENTION

This invention relates to carbonate polymers comprising in polymerized form dihydroxyaryl fluorene and crosslinkable moieties. The invention also relates to composites made from these polymers. The carbonate polymers of this invention are all capable of being crosslinked by activation of the crosslinkable moieties. Once crosslinked, polymers of dihydroxyaryl fluorene including composites demonstrate an excellent combination of properties including resistance to melting at high temperatures, solvent resistance, optical clarity, impact resistance, and physical strength. This excellent combination of properties makes these polymers particularly well suited for use in preparing molded articles, composites, and extruded articles such as sheet or film.

BACKGROUND OF THE INVENTION

One species of dihydroxyaryl fluorene, 9,9-bis(4-hydroxyphenyl) fluorene (BHPF), has been used previously for the manufacture of thermoplastic condensation polymers. For example, BHPF was used in the manufacture of polycarbonates for optical disks, in Japanese Patent No. 1-124358. BHPF has also been incorporated into polyester polymers (See U.S. Pat. No. 4,925,913, and P. W. Morgan, "*Aromatic Polyesters with Large Cross-Planar Substituents,*" Macromolecules 3:536–544, 1970.).

The brittleness of bisphenol fluorenone (i.e. BHPF) thermoplastic carbonate polymers was noted in Kambour, et. al., "*Tough Transparent Heat- and Flame-Resistant Thermoplastics via Silicone Block-Modified Bisphenol Fluorenone Polycarbonate,*" J. Applied Polymer Sci., 20:3275–3293 (1976).

Crosslinkable moieties were incorporated into carbonate polymers to be used in surface lamination of thermoplastic materials, in patent application No. WO 93/25607. BHPF was mentioned in that patent as one monomer which could be used to manufacture carbonate polymers for use in structures with a crosslinkable surface layer and a thermoplastic core layer.

It would be desirable to have an improved crosslinkable carbonate polymer possessing a good combination of product properties including impact resistance, solvent resistance, optical clarity, resistance to melting at high temperatures, and physical strength.

SUMMARY OF THE INVENTION

The invention is a carbonate polymer comprising in polymerized form dihydroxyaryl fluorene and a crosslinkable moiety. Dihydroxyaryl fluorene is any compound represented by the general formula below, wherein $R_1$, $R_2$, $R_3$, and $R_4$ independently in each occurrence are hydrogen, a low molecular weight alkyl group (four carbons or less), a halogen, or a phenyl group.

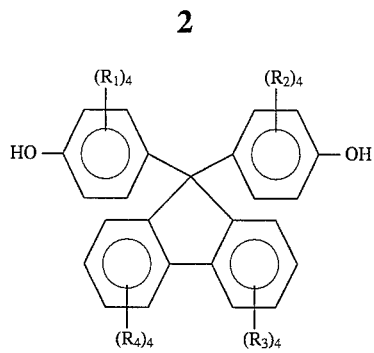

One particular embodiment of this invention is a carbonate polymer as described above, wherein $R_1$, $R_2$, $R_3$, and $R_4$ are all hydrogen, in which case the dihydroxyaryl fluorene is 9,9-bis (4-hydroxyphenyl) fluorene (BHPF).

The crosslinkable moiety of this invention can be directly in the backbone chain of the polymer molecule, but the moiety is preferably terminal or pendant, depending on the properties one desires. In a preferred embodiment, the crosslinkable moiety is an arylcyclobutene, such as benzocyclobutene (BCB). In another preferred embodiment, the crosslinkable moiety is terminally located on the polymer.

In another embodiment of this invention, the carbonate polymer comprising in polymerized form dihydroxyaryl fluorene and a crosslinkable moiety, additionally comprises at least one other multihydric monomer. In a preferred embodiment, the additional multihydric monomer is a diphenol such as 2,2-bis(4-hydroxyphenyl) propane ("bisphenol A").

Another aspect of this invention is the polymer described above in the form of a composite, wherein the polymer further comprises a filler. The filler is preferably a fibrous material, and more preferably carbon fiber.

The carbonate polymers of the present invention have surprisingly improved combinations of physical properties. It had been observed that crosslinked carbonate polymers in which bisphenol A is the only multihydric monomer species decrease in impact resistance (as measured by notched Izod resistance test) as the concentration of crosslinkable moieties in the crosslinkable polymer increases. However, carbonate polymers of the present invention exhibit the opposite effect. When crosslinked, these polymers increase in impact resistance as the crosslinkable moiety concentration increases. Carbonate polymers of the present invention show surprisingly improved combinations of physical properties, including impact resistance, solvent resistance, optical clarity, and high glass transition temperatures. Together, these properties make these polymers particularly well suited for use in preparing molded articles, composites, and extruded articles such as sheet or film.

DETAILED DESCRIPTION OF THE INVENTION

Carbonate polymers, including for example, polycarbonates and polyestercarbonates, are well known to those skilled in the art. In general, carbonate polymers can be prepared from one or more multihydric monomers by reacting the multihydric monomer(s) such as a dihydric phenol (or its condensation reactive derivative such as its metal phenolate) with a condensation reactive carbonate precursor. Carbonate precursors suitable for use in preparing carbonate polymers are well known and include phosgene, a haloformate, or a carbonate ester such as diphenyl carbonate. Carbonate polymers are prepared from these raw materials by an appropriate process selected from one of the known polymerization processes such as the known interfacial, solution or melt processes. General techniques for preparing carbonate polymers are well known and described in the literature. See for example U.S. Pat. Nos. 2,970,131, 2,999,835, 2,999,846, 3,028,365, 3,148,172, 3,153,008, 3,248,414, 3,271,367, 3,334,154, 3,912,687, 4,182,726, 4,286,085, 4,384,108, 4,452,968, 4,529,791, and 4,954,613, which are all incorporated herein by reference.

The choice of which polymerization process to use to prepare a given carbonate polymer depends on the physical properties of the raw materials used. In the case of crosslinkable carbonate polymers, the thermal reactivity of the crosslinkable moiety may be a critical factor in deciding which polymerization process to use. For example, the melt process is not appropriate if the crosslinkable moieties to be used in the polymerization reaction break down or form crosslinks at the temperature at which the melt process is carried out. The carbonate polymer of the present invention is preferably prepared with an interfacial process.

At least one of the multihydric monomers used to prepare the polymers of the present invention is dihydroxyaryl fluorene. Dihydroxyaryl fluorene is any compound represented by the general formula below, wherein $R_1$, $R_2$, $R_3$, and $R_4$ independently in each occurrence are hydrogen, a low molecular weight alkyl group (four carbons or less), a halogen, or a phenyl group. When $R_1$, $R_2$, $R_3$, and $R_4$ in the general formula below are all hydrogen, the dihydroxyaryl fluorene is 9,9-bis (4-hydroxyphenyl) fluorene (BHPF). In a preferred embodiment of this invention the dihydroxyaryl fluorene is 9,9-bis (4-hydroxyphenyl) fluorene (BHPF).

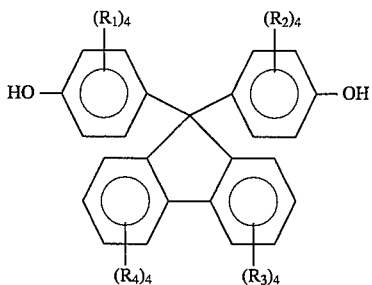

Crosslinkable carbonate polymers are prepared by incorporating into or attaching crosslinkable moieties to the polymer molecules. Possible crosslinkable moieties include acetylenes, allyls, nadic, epoxies, styryl, acrylate, methacrylate, propargyl, biphenylene, maleimide, cyanate, and arylcyclobutenes. Depending on the reactivity of the crosslinkable moieties used, crosslinking reactions can be initiated by thermal radiation, free radicals, or electromagnetic radiation. Examples of electromagnetic radiation which can be used for activation include microwave, infrared, ultraviolet, electron beam, or gamma radiation. For purposes of the present invention, it is preferable to use moieties which are capable of being crosslinked by thermal radiation, since such radiation can be applied by conventional methods. Preferred methods of applying thermal radiation include contact with heated surfaces or liquids, and contact with heated air or other gasses.

The choice of which moiety species to use for a given application depends on the physical properties desired. Generally, one tries to choose a moiety which is readily crosslinkable by thermal activation, but which is not so reactive that it begins to form crosslinks at the temperatures to be used in processing. Crosslinkable polymers prepared with such moieties are ideally suited for use in fabricating molded articles. Arylcyclobutenes, particularly benzocyclobutene, have been shown to produce polycarbonates with a favorable combination of physical properties when used as crosslinkable moieties in U.S. Pat. Nos. 5,198,527 and 5,171,824. The crosslinkable moiety in the carbonate polymer of the present invention is preferably an arylcyclobutene, and most preferably a benzocylobutene.

Where the crosslinkable moieties are attached to or incorporated into the polymer molecule can strongly affect its physical properties. Crosslinkable moieties can be attached pendant or terminal, or a combination of the two, to a carbonate polymer molecule. See, for example U.S. Pat. Nos. 5,198,527 (terminal arylcyclobutene), 4,708,994 (pendant benzocyclobutene). Crosslinkable moieties can be incorporated into the backbone of a carbonate polymer molecule, such as the unsaturated crosslinkable ester linkages described in U.S. Pat. No 4,925,913, resulting in a polyestercarbonate. Pendant moieties and internally incorporated moieties tend to be distributed inconsistently and irregularly along a polymer molecule. This irregular distribution pattern can detrimentally affect the physical properties of the polymer, such as causing premature gelling. Terminal moieties show no such irregular distribution pattern, as such moieties are only attached to the ends of the polymer molecules. By controlling the number of terminal moieties added relative to the amount of multihydric monomer used in a polymerization reaction, one can more readily control the number of moieties per molecule and the number of monomer segments between moieties. Preferably, the crosslinkable moieties of the present invention can be pendant or terminal or both pendant and terminal to the polymer chain, but they are more preferably only terminal.

The physical properties of crosslinked carbonate polymers are strongly affected by the average number of crosslinkable moieties per polymer molecule, the distribution of the moieties along each polymer chain, and the reactivity of the moieties. Together, these three factors determine the crosslink density of a crosslinked polymer. Crosslink density is defined as the the chain length or molecular weight of polymer between crosslink junctions. Crosslink density affects the solubility of a crosslinked polymer, as measured by the volume fraction of polymer in a solvent swollen network ($v_p$), and its heat resistance, as measured by the glass transition temperature ($T_g$). For a good discussion of the relationship between $v_p$, $T_g$, and crosslink density, see WO 93/25607. In general, as crosslink density is reduced, the number of crosslinks formed per molecule goes down, heat resistance goes down, and solubility goes up. At low crosslink densities, the physical characteristics of a crosslinked polymer approach those of a branched thermoplastic polymer.

In producing the carbonate polymers of the present invention, the number of moles of crosslinkable moiety added per mole of multihydric monomer is preferably at least about 0.001, more preferably at least about 0.01, more preferably at least about 0.03, and most preferably at least about 0.06. The maximum number of moles of crosslinkable moiety added per mole of multihydric monomer is preferably about 5, more preferably about 2, and most preferably about 1.

The physical properties of a polymer also depend on the characteristics of the monomer species in the polymer backbone. Two or more species of multihydric monomer can be mixed together and copolymerized in order to produce a copolycarbonate with a particular combination of desirable characteristics. For example, when a dihydroxyaryl fluorene such as BHPF is the only monomer species in a polymer, the polymer will have several desirable characteristics (eg. ignition resistance, optical clarity, heat resistance), but it will also tend to be brittle. When certain multihydric monomers, such as 2,2-bis(4-hydroxyphenyl) propane, are copolymerized in an optimal mixture with dihydroxyaryl fluorene, the copolymer which results retains the desirable characteristics of a dihydroxyaryl fluorene. Such a copolymer will generally have reduced brittleness compared to polymers in which dihydroxyaryl fluorene is the only monomer species polymerized therein.

In a further embodiment, the carbonate polymer of the present invention comprises in polymerized form dihydroxyaryl fluorene and a crosslinkable moiety, and a second multihydric monomer which is not a dihydroxyaryl fluorene. The mole percent of the second monomer added, based on the total number of moles of multihydric monomer used, is preferably at least about 1%, more preferably at least about 25%, and most preferably at least about 50%. The maximum mole percent of second monomer added based on the total number of moles of multihydric monomer used is up to about 99%, more preferably up to about 90%, more preferably up to about 80%, and most preferably up to about 75%.

Dihydric phenols are one type of multihydric comonomer which can be used in the carbonate polymers of the present invention. Suitable dihydric phenols include 2,2-bis(4-hydroxyphenyl) propane, hydpoquinone, resopcinol, 2,2-bis-(4-hydpoxyphenyl)-pentane, 2,4'-dihydroxy diphenyl methane, bis-(2-hydroxyphenyl)methane, bis-(4-hydroxyphenyl)-methane, bis(4-hydroxy-5-nitpophenyl)-methane, 1,1-bis-(4-hydpoxyphenyl)-ethane, 3,3-bis-(4-hydroxyphenyl)-pentane, 2,2'-dihydpoxydiphenyl, 2,6-dihydroxy naphthalene, bis-(4-hydroxyphenyl) sulfide, bis-(4-hydpoxyphenyl) sulfone, 2,4'-diaydroxydiphenyl sulfone, 5'-chloro-2,4'-dihydpoxydiphenyl sulfone, bis-(4-hydpoxyphenyl) diphenyl disulfone, 4,4'-dihydpoxydiphenyl ether, 4,4'-dihydroxy-3,3'-dichlopo diphenyl ether, and 4,4'-dihydroxy-2,5-diethoxydiphenyl ether. The multihydric comonomer of the present invention is preferably a dihydric phenol, and more preferably 2,2-bis(4-hydroxyphenyl) propane.

In addition to preparing carbonate polymers from one or more multihydric monomers and a carbonate precursor, it is also possible to employ multihydric monomers in combination with a condensation reactive precursor and a glycol, a hydroxy terminated polyester, or a dibasic acid in the event a polyestercarbonate is desired. Methods of producing polyestercarbonates are known in the prior art. Examples of methods by which polyestercarbonates may be produced include those methods described in U.S. Pat. Nos. 3,169,121, 4,287,787, 4,156,069, 4,260,731, 4,330,662, 4,360,656, 4,374,973, 4,255,556, 4,388,455, 4,355,150, 4,194,038, 4,238,596, 4,238,597, 4,252,939, 4,369,303, and 4,105,633, and articles by Kolesnikov et.al. published in *Vysokomol Soedin* as B9, 49 (1967), A9, 1012 (1967), A9, 1520 (1967), and A10, 145(1968), all of which are incorporated herein by reference. In another aspect of the present invention, the carbonate polymer is a polyestercarbonate. The polyestercarbonate of the present invention preferably contains less than about 50, more preferably less than about 20, more preferably less than about 10, and most preferably less than about 5 percent of an ester linking group.

Carbonate polymer composites made from crosslinkable polymers are well known to those skilled in the art. Such composites are generally formed by combining a polymer with a filler such as fibrous material, particulate material, or another polymer. Fibrous material suitable for use as a filler in crosslinkable polymer composites includes fibers of glassy carbony boron, aromatic polyamides, or cellulose. A polymer composite is formed when a crosslinkable polymer is crosslinked after being combined with a filler. Numerous methods for manufacturing polymer composites are described in the literature. Seer for example Composites: A Design Guide, by Terry Richardson, Ch. 4: "How are Composites Formed?," pub. by Industrial Press Inc (1987), Fundamentals of Composites Manufacturing: Materials, Methods, and Applications, by Dr. A. B. Strong, pub. by Society of Manufacturing Engineers (1989). The manufacturing method chosen depends on the type of material used as a filler and on the properties desired in the end product.

The type of material chosen as a filler can strongly affect the physical properties of a polymer composite made from that filler. The effects on tensile strength and elasticity of typically employed fibrous fillers on the physical properties of polymer composites is described in the Encyclopedia of Polymer Science and Engineering, "Composites," Vol 3, P 776 et seq. (1989). In general, fibrous fillers with high tensile strength and elasticity produce composites with low density and high strength. The high strength, high elasticity, and low coefficient of thermal expansion of carbon fibers make this material particularly well suited as a structural fibrous filler for manufacturing polymer composites. For a good discussion of the properties of carbon fiber and its suitability as a filler in polymer composites, see Fundamentals of Composites Manufacturing, supra, pp. 53–60, or see Carbon Fibers, by Donnet et. al., pub. by Marcel Dekker, Inc., (1984).

The carbonate polymer composite form of the present invention is a composition comprising a filler and a carbonate polymer comprising dihydroxyaryl fluorene and a crosslinkable moiety, described and defined above. The filler is preferably a fibrous material, and more preferably a structural fibrous material. The filler is most preferably carbon fiber.

The carbonate polymers of this invention can be employed in mixtures, alloys, or blends with other polymer resins, including mixtures with other condensation polymers. In addition, other additives can be included in the carbonate polymers and composites of the present invention such as pigments, dyes, antioxidants, heat stabilizers, ignition and drip resistant additives, ultraviolet light absorbers, mold release agents, impact modifiers, and other additives commonly employed in carbonate polymer compositions.

The following Experiments are given to further illustrate the invention and should not be construed as limiting its scope.

Experiments

A copolycarbonate of 9,9-bis(4-hydroxyphenyl) fluorene (BHPF) as the dihydroxyaryl fluorene, bisphenol A (BA) as an additional multihydric monomer, and benzocyclobutene (BCB) as the crosslinkable moiety was prepared as follows. The mole percent of each monomer used in this copolycarbonate, based on the total number of moles of multihydric monomer, was 50 percent BHPF and 50 percent BA, and the molar ratio of BCB to multihydric monomer was 0.06.

A 3L 4-neck round bottom flask equipped with a thermometer, condenser, phosgene/nitrogen inlet, and a paddle stirrer was charged with BA (55.16 g, 0.242 mol), BHPF (84.79 g, 0.242 mol), 4-hydroxybenzocyclobutene (3.48 g, 0.029 mol), pyridine (99.5 g, 1.258 mol), and methylene chloride (1.2L). The resulting solution was stirred at 250 revolutions per minute (rpm) and slowly purged with nitrogen as phosgene (50.9 g, 0.514 mol) was bubbled in over 34 minutes while maintaining the reactor temperature at 19°–25°0 C. During the final stages of phosgene addition, samples of the reaction mixture were added to a solution of 0.1% (by weight) of 4-(4-nitrobenzyl) pyridine in tetrahydrofuran to determine the reaction end point. The reaction mixture was worked up by adding methanol (5 mL) and then a solution of 45 mL of concentrated HCl in 135 mL water. After stirring for 15 min. at 200 rpm, the mixture was poured into a 4L separatory funnel and allowed to stand overnight. The methylene chloride layer containing the dissolved polymer was separated and washed further with a solution of 15 mL concentrated HCl in 300 mL water, followed by 300 mL water, and was then passed through a column of MSC-1-H ion exchange resin (0.5 L bed volume).

The product was isolated by adding one volume of the methylene chloride solution to four volumes of a hexane/acetone (2/1 v/v) mixture in an explosion resistant Waring blender. The product was filtered, dried in a hood overnight, and then dried for 48 hr. in a vacuum oven at about 120° C. The dried product weighed 144.0 g and had an inherent viscosity (IV) of 0.248 dL/g (determined in methylene chloride at 0.5 g/dL and 25° C). The results of tests performed on the copolycarbonate prepared as described above (Sample 7) are summarized on Tables 1–3.

The general procedure described above was used to prepare and fabricate additional BHPF/BA copolycarbonates with various levels of BCB termination and with different relative amounts of BHPF and BA (with mole percents based on the total amount of multihydric monomer used of either 75% BA and 25% BHPF, or 50% BA and 50% BHPF). Copolycarbonates were also prepared according to the procedure described above, using 4-tertbutylphenol (TBP) as a non-crosslinkable terminal moiety in place of BCB. The multihydric monomer composition expressed in terms of mole percent based on the total amount of multihydric monomer used ("BA Mole %" and "BHPF Mole %"), and crosslinkable moiety composition expressed in terms of the ratio of moles of BCB per total moles of multihydric monomer used ("Mole BCB/Mole Mult. Monomer") are given in Tables 1–3 for each copolymer tested. The results of all these experiments are presented in Tables 1–3. The test results obtained from the TBP-terminated polymers are presented as sample numbers C1 and C2 in Tables 1–3.

For the polymer analysis and evaluations indicated in Tables 1–3, standard experimental and test methods were used. Molecular weight ("Mw") and number average molecular weight ("Mn") were determined on the uncrosslinked samples by size exclusion chromatographic (SEC) analysis. Inherent viscosities ("IV") of the polycarbonates were determined at 25° C. in methylene chloride at a concentration of 0.5 g/dL. The results of these first three tests are presented in Table 1.

Differential scanning calorimetry was used to determine the glass transition temperature of each polymer prior to crosslinking ("$T_g$ Scan 1"), to determine the amount of energy released upon crosslinking or curing ("DSC Exo"), and to determine the glass transition temperature of each polymer after crosslinking ("$T_g$ Scan 2"). The first scan was run at a heating rate of 20° C./min to 350° C. it showed a glass transition temperature ($T_g$) for Sample 7 of 207° C. The curing exotherm was determine, during the first scan from about 220° to 340° C. The exotherm peak for Sample 7 appeared at 293° C. (Tmax), and the curing exotherm of 18 Joules/gram ("DSC Exo") was determined by measuring the area under that peak. The second scan showed a glass transition temperature ($T_g$) for this copolycarbonate (Sample 7) of 236° C. The 1H-NMR spectrum (CDCl$_3$/TMS) of the product was in agreement with the target copolycarbonate composition. A compression molded film of this copolycarbonate, prepared by curing at 275° C. for 3 min, was clear, well-fused, and insoluble in methylene chloride. Differential scanning calorimetry results for all samples tested are given in Table 1.

The data in Table 1 indicates that increasing the amount of BCB terminator results in a reduction in copolycarnonate molecular weight, as evidenced by the inherent viscosity (IV) and size-exclusion chromatography (Mw and Mn) results. The differential scanning calorimetry results in Table 1 also show a decrease in first scan $T_g$, an increase in curing exotherm, and an increase in second scan $T_g$ as the BCB level is increased.

TABLE 1

| Sample Number | BA Mole % | BHPF Mole % | Mole BCB/ Mole Mult. Monomer | IV (dL/g) | Mw (SEC) | Mw/Mn (SEC) | DSC Exo (J/g. Scan 1) | Tg (°C.) Scan 1 | Tg (°C.) Scan 2 |
|---|---|---|---|---|---|---|---|---|---|
| C1 | 75 | 25 | 0 | 0.513 | | | 0 | 188 | 189 |
| 1 | 75 | 25 | 0.03 | 0.369 | 24,422 | 2.68 | 8.4 | 193 | 198 |
| 2 | 75 | 25 | 0.06 | 0.246 | 13,696 | 2.18 | 19.8 | 182 | 199 |
| 3 | 75 | 25 | 0.1 | 0.212 | 10,696 | 2.14 | 29.3 | 177 | 207 |
| 4 | 75 | 25 | 0.2 | 0.148 | 6,179 | 1.98 | 55.2 | 159 | 204 |
| 5 | 75 | 25 | 0.8 | 0.059 | 1,712 | 1.81 | 197.3 | 73 | 228 |
| C2 | 50 | 50 | 0 | 0.436 | | | 0 | 229 | 230 |
| 6 | 50 | 50 | 0.03 | 0.338 | 22.984 | 2.64 | 7.6 | 226 | 236 |
| 7 | 50 | 50 | 0.06 | 0.248 | 15,592 | 2.07 | 18.0 | 207 | 236 |
| 8 | 50 | 50 | 0.1 | 0.200 | 11,532 | 2.16 | 23.4 | 210 | 234 |
| 9 | 50 | 50 | 0.2 | 0.128 | 5,862 | 1.90 | 50.2 | 187 | 240 |
| 10 | 50 | 50 | 0.6 | 0.069 | 2,302 | 1.60 | 144.5 | 113 | 245 |
| 11 | 50 | 50 | 0.8 | 0.058 | 2,087 | 2.06 | 199.3 | 89 | 270 |

Mechanical properties for the copolycarbonates were determined using compression molded plaques with approximate dimensions 6 in. X 6 in. X ⅛ in. The plaques were prepared using a Tetrahedron MTP-14 press according to the following temperature (° C.)/platen pressure (klb)/time (min) molding cycle: step 1= 220/1/15, step 2=220/60/1, step 3=320/60/1, step 4=100/60/1.

The notched izod impact resistance was tested according to ASTM D-256-72A on 3.2 millimeter (⅛ in.) compression molded copolycarbonate samples, prepared as described above. The results ("N. Izod") are given in Table 2 in foot pounds per inch.

The tensile testing is performed on 3.2 millimeter (mm) (⅛ in.) compression molded copolycarbonate samples, prepared as described above. The analyses were performed according to ASTM D-638 on type V samples. Sample elongation data is presented in Table 2 in terms of percent elongation at yield ("Elong. Yield"). Tensile modulus ("T. Modulus") and tensile yield ("T. Yield") results are given in pounds per square inch (psi).

Fracture toughness was determined according to ASTM E-399 on compression molded specimens with nominal dimensions of 27.1 mm X 26.0 mm X 3.2 mm (1.062 in. X 1.025 in. X ⅛ in.). Samples for this test were fabricated by compression molding using a 1.5 in. X 2.5 in. cavity mold. Fracture toughness was tested by using a razor blade to introduce a crack at one edge of a sample, by exposing the samples to increasing loads of tension, and by determining the tension load at the initiation of crack propagation. Fracture toughness ("$K_{1c}$") is a function of the load at initiation and the thickness and width of the samples tested. The fracture toughness results are given in Table 2 in units of psi X in$^{1/2}$.

Mechanical properties for compression molded samples are shown in Table 2. The incorporation of BCB and subsequent crosslinking during fabrication gives the surprising results of improved notched Izod impact resistance compared to the TBP-terminated linear polymers. The tensile properties listed (tensile strength at yield, elongation at yield, and tensile modulus) are also maintained very well in the compositions evaluated.

dimensions of the samples before and after soaking, and by using those measurements to calculate the volume of each sample before and after soaking.

The dichloromethane absorption and swelling results for molded samples are listed in Table 3. These results show a decrease in absorption and swelling with increasing crosslink density of the molded samples. The comparison linear copolycarbonates (samples C1 and C2) dissolved during this evaluation.

The results of two moisture uptake tests ("$H_2O$ Abs") are also given in Table 3, in terms of percent absorption. In Test 1, samples of crosslinked copolycarbonates were soaked in water for 46 days at 25° C. Percent absorption was determined by weighing the samples before and after soaking, and calculating the percent increase in weight due to moisture uptake. The results of the first test show slightly higher amounts of moisture absorption at the higher BCB levels than at the lower BCB levels. However, all copolycarbonates tested absorbed less than 1% moisture at this temperature. In Test 2, two representative samples (3 and 7) were also exposed to water at room temperature (25° C.) for seven days followed by exposure to boiling water (100° C.) for three days. Both samples absorbed slightly more moisture than the same samples absorbed in the first test, but the amount of moisture absorbed at this temperature was less than 1%.

TABLE 2

| Sample Number | BA Mole % | BHPF Mole % | Mole BCB/ Mole Mult. Monomer | N. Izod (ft-lb/in) | T. Yield (psi) | T. Modulus ($10^5$ psi) | Elong., Yield (%) | $K_{1c}$ (psi-in$^{1/2}$) |
|---|---|---|---|---|---|---|---|---|
| C1 | 75 | 25 | 0 | 2.3 | 10,613 | 3.8 | 7.6 | 1,849 |
| 1 | 75 | 25 | 0.03 | 4.7 | 10,287 | 3.9 | 7.5 | 1,275 |
| 2 | 75 | 25 | 0.06 | 3.6 | 11,185 | 3.9 | 7.5 | 1,175 |
| 3 | 75 | 25 | 0.1 | 4.0 | 10,364 | 3.9 | 7.6 | 1,157 |
| 4 | 75 | 25 | 0.2 | 3.7 | | | | 1,187 |
| C2 | 50 | 50 | 0 | 1.7 | 11,890 | 3.9 | 8.0 | 1,334 |
| 6 | 50 | 50 | 0.03 | 2.4 | 12,202 | 4.2 | 7.9 | 951 |
| 7 | 50 | 50 | 0.06 | 2.4 | 12,576 | 4.3 | 8.3 | 957 |
| 8 | 50 | 50 | 0.1 | 2.7 | 12,189 | 4.3 | 8.5 | 931 |
| 9 | 50 | 50 | 0.2 | 2.4 | | | | 794 |

The percent absorption and swelling tests show the resistance to solvent of a polymer. Absorption and swelling were measured on ⅛ in. thick compression molded samples of varying widths and lengths, which were soaked in dichloromethane. Percent absorbance was determined by measuring the weight of the samples before and after soaking in the solvent. Percent swelling was determined by measuring the

TABLE 3

| Sample Number | BA Mole % | BHPF Mole % | Mole BCB/ Mole Mult. Monomer | $CH_2Cl_2$ Absorption (%) | $CH_2Cl_2$ Swelling (%) | $H_2O$ Abs. (%) Test 1 | $H_2O$ Abs. (%) Test 2 |
|---|---|---|---|---|---|---|---|
| C1 | 75 | 25 | 0 | Dissolved | Dissolved | 0.45 | |
| 1 | 75 | 25 | 0.03 | Broke Apart | Broke Apart | 0.43 | |
| 2 | 75 | 25 | 0.06 | 484 | 416 | 0.45 | |
| 3 | 75 | 25 | 0.1 | 320 | 254 | 0.55 | 0.72 |
| 4 | 75 | 25 | 0.2 | 198 | 162 | 0.55 | |
| 5 | 75 | 25 | 0.8 | 88 | 67 | 0.67 | |
| C2 | 50 | 50 | 0 | Dissolved | Dissolved | 0.59 | |
| 6 | 50 | 50 | 0.03 | 1,205 | 1,196 | 0.63 | |
| 7 | 50 | 50 | 0.06 | 373 | 284 | 0.60 | 0.84 |
| 8 | 50 | 50 | 0.1 | 296 | 248 | 0.63 | |
| 9 | 50 | 50 | 0.2 | 196 | 177 | 0.70 | |
| 11 | 50 | 50 | 0.8 | 88 | 66 | 0.90 | |

A 5 in. X 7 in. composite panel of BA/BHPF/BCB copolycarbonate was prepared from Celion® G30–500 carbon fiber fabric from BASF (the fabric is constructed using an 8-harness satin weave and has an areal weight of 375 g/m$^2$) and BA/BHPF/BCB copolycarbonate (Sample number 5) with a mole percent based on the total number of moles of monomer of 75 percent BA and 25 percent BHPF, and with a molar ratio of BCB to multihydric monomer of 0.8. The composite panel was processed by Resin Flow Molding (RFM) the copolycarbonate and the carbon fiber fabric, using an RFM mold assembly designed to make 5 in. X 7 in. panels. The mold assembly consisted of a base plate, a mold spacer, a mold top plate, and an anvil.

The Resin Flow Molding was performed as follows. An 16-ply quasi-isotropic preform of the carbon fiber fabric was constructed using a (+45/0/– 45/90)$_{2s}$ lay up stacking sequence. The fiber preform was trimmed to approximately 5.75 in. X 6.75 in. and weighed 122 g. The preform was placed on top of 79 g of the copolycarbonate. A sheet of Upilex™ film ("Upilex" is trademark of Ube Industries, Inc.) was placed over the fiber preform to act as a diaphragm. The mold assembly was sealed by tightening bolts and vacuum was applied to ensure an adequate seal. The vacuum was turned on at room temperature and the mold assembly was placed in a MTP-14 Tetrahedron 50 ton press. The pressure, temperature, ramp rates, and holding times were programmed in the press according to the following cure schedule: 1) the mold was heated to 200° C. with a heating rate of 15° F./min, 2) held at 200° C. for one hour, 3) heated with a heating rate of 5° F./min and held at 250° C. for 35 min., and 4) cooled to room temperature with a cooling rate of 5° F./min. The vacuum was removed when the press temperature reached 200° C. After the removal of vacuum, 140 psi pressure was applied to the panel and maintained throughout the cure cycle.

The Compression After impact (CAI) test specimen was trimmed from the panel to final dimensions of 4 in. X 6 in. The impact was achieved by using a Dynatup Model 8200 drop weight impactor with an impact energy of 1500 in.-lb/in. The compressive test was performed in a CAI test fixture (Boeing Test Method BMS- 276-C). One would normally expect an unreinforced copolycarbonate base resin such as this one (Sample 5) with a high glass transition temperature (Tg=228° C.) and low fracture toughness ($K_{1c}$=650 psi-in$^{1/2}$) to produce a composite panel with low impact resistance. However, the CAI strength of the panel was found to be 42,000 psi, an unexpectedly high value.

The above general procedure for composite fabrication was also used to prepare a panel based on BA/BHPF/BCB copolycarbonate (Sample 11) with a mole percent based on the total number of moles of monomer used of 50 percent BA and 50 percent BHPF, and with a molar ratio of BCB to monomer of 0.8. Given the high Tg (270° C.) of the unreinforced base resin, one would normally expect composite panels produced from this resin to have low impact strength. However, the Compression After Impact strength of the panel produced from this copolycarbonate (Sample 11) was found to be 37,000 psi, a surprisingly high value.

What is claimed is:

1. A carbonate polymer comprising in polymerized form a dihydroxyaryl fluorene multihydric monomer and optionally up to about 99 mole percent of a second multihydric monomer which is not a dihydroxyaryl fluorene, which mole percent is based on the total moles of multihydric monomer, and a crosslinkable moiety wherein the mole ratio of crosslinkable moiety to multihydric monomer is at least about 0.001 to 1 and up to about 5 to 1.

2. The polymer of claim 1 wherein the dihydroxyaryl fluorene is 9,9-bis (4-hydroxyphenyl) fluorene.

3. The polymer of claim 1 wherein the crosslinkable moiety is terminal.

4. The polymer of claim 1 wherein the mole ratio of crosslinkable moiety to multihydric monomer is at least about 0.01 to 1 and up to about 1 to 1.

5. The polymer of claim 1 wherein the crosslinkable moiety is an arylcyclobutene.

6. The polymer of claim 5 wherein the arylcyclobutene is benzocyclobutene.

7. The polymer of claim 1 wherein the polymer additionally comprises in polymerized form a second multihydric monomer which is not a dihydroxyaryl fluorene.

8. The polymer of claim 7 wherein the mole percent of the second monomer, based on the total number of moles of the first monomer and the second monomer, is at least about 1%.

9. The polymer of claim 7 wherein the mole percent of the second monomer, based on the total number of moles of the first monomer and the second monomer, is at least about 25%.

10. The polymer of claim 7 wherein the second monomer is a diphenol.

11. The polymer of claim 10 wherein the diphenol is 2,2-bis(4-hydroxyphenyl) propane.

12. The polymer of claim 1 comprising in polymerized form 9,9-bis(4-hydroxyphenyl) fluorene as the dihydroxyaryl fluorene multihydric monomer, benzocyclobutene as a terminally located crosslinkable moiety, and a second multihydric monomer, 2,2-bis(4-hydroxyphenyl) propane, wherein the mole percent of the second multihydric monomer, based on the total number of moles of the first multihydric monomer and the second multihydric monomer, is at least about 25%, and wherein the mole ratio of benzocyclobutene to multihydric monomer is at least about 0.1 and up to about 1.

13. The polymer of claim 1 in the form of a composite, wherein the polymer further comprises a filler.

14. The polymer of claim 13 wherein the filler is a fibrous material.

15. The polymer of claim 14 wherein the fibrous material is carbon fiber.

16. The polymer of claim 13 wherein the dihydroxyaryl fluorene is 9,9-bis(4-hydroxyphenyl) fluorene.

17. The polymer of claim 13 wherein the crosslinkable moiety is benzocyclobutene.

18. The polymer of claim 13 wherein the polymer additionally comprises a second 2,2-bis(4-hydroxyphenyl) propane multihydric monomer in polymerized form.

19. The polymer of claim 18 wherein the mole percent of second multihydric monomer, based on the total number of moles of first multihydric monomer and second multihydric monomer, is at least about 25%.

* * * * *